United States Patent [19]

Suzuki

[11] 4,197,075
[45] Apr. 8, 1980

[54] APPARATUS FOR STRETCHING ATTACHMENT DEVICES AT HIGH SPEEDS

[75] Inventor: Tadashi Suzuki, Kita-adachi, Japan

[73] Assignee: Sato Gosei Co., Ltd., Tokyo, Japan

[21] Appl. No.: 929,980

[22] Filed: Aug. 1, 1978

Related U.S. Application Data

[62] Division of Ser. No. 796,026, May 11, 1977, Pat. No. 4,143,113.

[51] Int. Cl.² ............ B29D 31/00; B29F 1/00; B29C 17/02
[52] U.S. Cl. ............ 425/214; 425/324.1; 425/383; 425/450.1; 425/DIG. 5; 425/DIG. 53
[58] Field of Search ............ 425/324.1, 325, 383, 425/392, 404, 445, 450.1, DIG. 17, DIG. 53, DIG. 236, 214; 249/67, 68; 264/291; 24/150 FP

[56] References Cited

U.S. PATENT DOCUMENTS

| | | | |
|---|---|---|---|
| 519,127 | 5/1894 | Jones | 249/68 |
| 2,890,488 | 6/1959 | Gemberling | 425/DIG. 5 |
| 2,997,742 | 8/1961 | Mieville | 425/450.1 |
| 3,380,122 | 4/1968 | Kirk | 249/67 |
| 3,781,402 | 12/1973 | Hanggi et al. | 264/291 |
| 3,797,979 | 3/1974 | Greenwood | 425/DIG. 5 |

Primary Examiner—James B. Lowe
Attorney, Agent, or Firm—Armstrong, Nikaido, Marmelstein & Kubovcik

[57] ABSTRACT

An apparatus for molding and stretching at high speed an attachment device integrally composed of a synthetic resin and comprising a head, a cross-bar and a filament integrally connecting the head and the cross-bar to each other is disclosed. The apparatus is comprised of a fixed frame, two movable frame portions, four mold members, two cam rod members, and a cam shaft. The two movable frame members are movably connected to the fixed frame. The four mold members are positioned on the two movable frame members, the mold members being movable relative to one another. The two cam rod members are secured to the fixed frame, and the cam shaft member is mounted on one of the mold members. When the movable frame members are moved relative to the fixed frame, they cause the cam shaft to move along one of the cam rod members, thus causing two of the mold members to be pulled away from the remaining two mold members, thereby stretching the filament connecting portion of the attachment device. As the cam shaft is moved along the other cam rod, the two mold members are moved back towards the other two mold members, thus forceably relaxing the filament.

4 Claims, 10 Drawing Figures

APPARATUS FOR STRETCHING ATTACHMENT DEVICES AT HIGH SPEEDS

This is a division of application Ser. No. 796,026, filed May 11, 1977, now U.S. Pat. No. 4,143,113.

BACKGROUND OF THE INVENTION (1) Field of the Invention

The present invention relates to an improvement in an apparatus for stretching attachment devices for attaching tags and the like to merchandise.

(2) Brief Description of the Prior Art

Various attachment devices for attaching tags and the like to merchandise, which are integrally molded from synthetic resins such as nylon, have heretofore been proposed and developed. The prototype of now broadly used attachment devices was developed by Dennison Manufacturing Company, U.S.A., and the structure is disclosed in the specification of U.S. Pat. No. 3,103,666. More specifically, the attachment device disclosed in this U.S. patent specification comprises a cross-bar, a filament extending from the central portion of the cross-bar rectangularly thereto and a head attached to the filament rectangularly thereto. When this attachment device was first developed, the foregoing three portions were merely molded integrally from a synthetic resin, and the strength of the filament portion was low and it was difficult to secure tags or the like by means of such attachment device.

As is well known in the art, in a linear polymer, just after molding molecules are not arranged in a certain direction and therefore, the strength among molecules is very low. Accordingly, the above mentioned attachment device is fragile and is readily broken when slightly bent. As means for overcoming this defect, there has been developed and adopted a method in which the filament portion is stretched to cause orientation of molecules and increase the strength.

This method for stretching attachment devices is divided into two types; namely, a method in which an attachment device is taken out of a mold after molding and the attachment device is fed to a stretching machine and is stretched, and a method in which an attachment device is stretched immediately after molding by utilizing a mold. The former method is not suitable for high-speed stretching because the method involves two separate steps and the stretchability is degraded because of moisture absorbed during the course between the two steps. Moreover, this method is defective in that the productivity is low. The latter method is far excellent over the former method with respect to the productivity because the stretching step can be conducted continuously to the molding step.

At the step of the filament portion, it is important that filaments of a group of attachment devices should be uniformly stretched and that cross-bars should not be deformed during the stretching step. However, these two important requirements can hardly be satisfied according to any of the foregoing conventional methods. Therefore, the stretching cannot but be performed at low speeds very carefully, and according to the conventional methods, it is very difficult or impossible to perform the stretching operation at a high speed uniformly.

OBJECTS OF THE INVENTION

The present invention has been completed as a result of our research works made with a view to overcoming or moderating the foregoing defects involved in the conventional methods.

It is therefore a primary object of the present invention to provide an apparatus for stretching attachment devices in which attachment devices can be stretched while preventing undesirable deformation in cross-bars of the attachments devices by relaxing filaments after stretching.

Another object of the present invention is to provide an apparatus for stretching attachment devices in which filaments of a group of attachment devices to be stretched simultaneously are uniformly stretched and tough attachment devices uniform in the strength can be obtained.

Still another object of the present invention is to provide an apparatus for stretching attachment devices in which the stretching operation can be performed at high speeds.

BRIEF SUMMARY OF THE INVENTION

In accordance with the present invention, the foregoing objects and other objects can be attained by an apparatus characterized in that just after stretching of an attachment device comprising a head, a cross-bar and a filament connecting said head and cross-bar to each other, the filament is relaxed to shorten the stretched length slightly by actuating each of gripping means for gripping said head and cross-bar in a direction opposite to the stretching direction or by the self-relaxing action of the filament. The ratio of the relaxation is ordinarily 10 to 40% preferably 20 to 35%.

The foregoing and other objects and advantages of the present invention will be apparent from the following detailed description made by reference to the accompanying drawing.

DETAILED DESCRIPTION OF THE PREFERRED EMBODIMENTS

Figure 1:
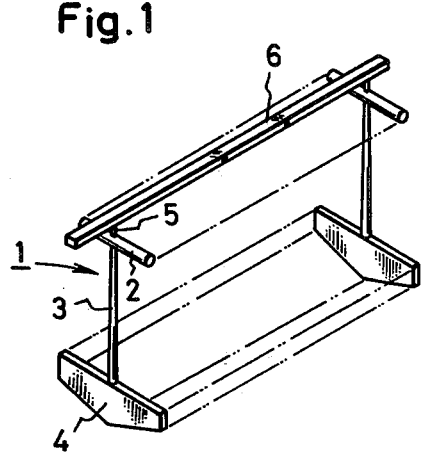
FIG. 1 is a perspective view illustrating an example of a group of attachment devices.

Referring now to FIG. 1 illustrating an example of a group of attachment devices, each attachment device 1 comprises a cross-bar 2, a head 4 having a substantially triangular shape and a filament 3 connecting the cross-bar 2 and head 4 to each other, and the attachment device 1 as a hole has an integral I-shaped structure. For facilitation of the manufacture and use, 20 to 50 of these attachment devices are ordinarily set in one group. Accordingly, a connecting member 5 is formed on a part of the cross-bar 2 and a group of attachment devices as shown in FIG. 1 is formed by connecting the respective attachment devices 1 at these connecting members 5 to a connecting rod 6.

Figure 2:
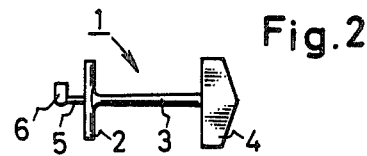
FIG. 2 is a front view showing an attachment device which is in the as-molded state before stretching.

The attachment device 1 is molded from a synthetic resin, for example, nylon, and in the as-molded and unstretched state, as shown in FIG. 2, the filament 3 is ordinarily thin in the portion close to the cross-bar 2 and thick in the portion close to the head 4, and the attachment device 1 as a whole has a tapered configuration.

Figure 3:
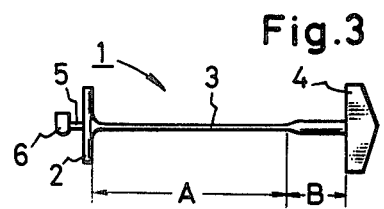
FIG. 3 is a front view showing an attachment device just after stretching.

The cross-bar 2 and head 4 of the attachment device 1 in such state are gripped and held respectively by gripping means of a mold or the like and a force is applied to the attachment device 1 through the gripping means in such a direction as separating the cross-bar 2 and head 4 from each other, whereby the filament 3 is stretched and a stretched attachment device 1 as shown in FIG. 3 is obtained. At this stretched step, stretching starts at a minimum-diameter portion of the filament 3 and gradually shifts to larger-diameter portions. Accordingly, the portion indicated by A in FIG. 3 is sufficiently stretched but the portion indicated by B in FIG. 3 is not substantially stretched.

Figure 4:
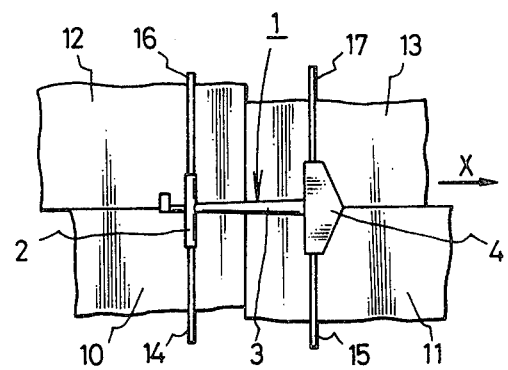
FIGS. 4 to 6 are diagrams illustrating movements of a mold when the stretching operation is carried out according to the present invention.

Stretching of attachment devices 1 may be accomplished not only by using a mold used for molding attachment devices but also by using a different stretching apparatus after transferring the attachment devices to this stretching apparatus. An embodiment of the present invention in which stretching is carried out by using a mold used for molding attachment devices will now be described by reference to FIGS. 4 to 6.

Figure 6:
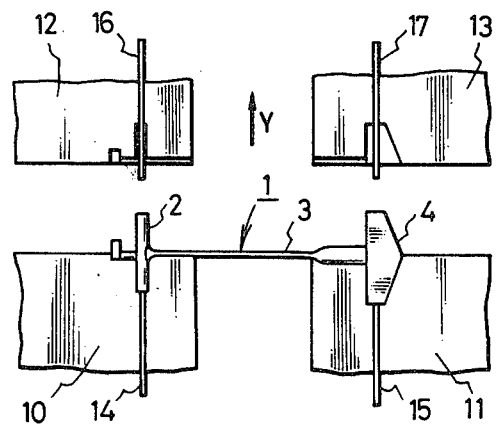

A mold that is used in this embodiment is divided into 4 sections. Namely, the mold comprises lower mold parts 10 and 11 and upper mold parts 12 and 13. When stretching of an attachment device 1 is carried out, the lower mold part 10 and upper mold part 12 are combined and fixed to grip and hold the cross-bar 2 of the attachment device 1, and in this state, the lower mold part 11 and upper mold part 13 gripping and holding the head 4 are moved by a predetermined length in a direction X, namely in a direction of the length of the filament 3. Further, as shown in FIG. 6, the upper mold parts 12 and 13 may be moved in a direction Y, namely in a direction traversing the filament 3 so that after the stretching operation, the stretched attachment device 1 can be taken out of the mold. Pins 14, 15, 16 and 17 are formed on the mold parts 10, 11, 12 and 13, respectively, to facilitate the operation of taking the stretched attachment device 1 out of the mold.

The steps for production of attachment devices will now be described in order.

First Step

Respective mold parts 10, 11, 12 and 13 are assembled and contact faces are contacted to form an integrated mold having a cavity corresponding to a configuration of an attachment device to be molded. A resin such as nylon is injected into this cavity by means of an injection molding machine (see FIG. 4).

Second Step

When the resin is injected into the cavity, an original shape of the attachment device is formed. On completion of injection of the resin, the upper mold part 13 and lower mold part 11 are instantaneously moved in a direction indicated by arrow X, whereby the distance between contact faces $F_1$ and $F_2$ of the left and right mold parts is expanded to $X_1$ (see FIG. 5).

Third Step

Figure 5:
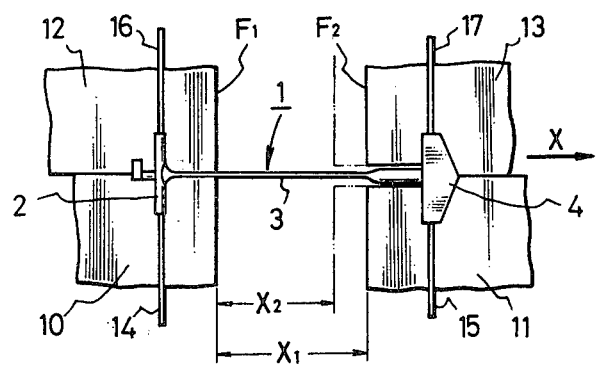

After completion of the second step, the lower mold part 11 and upper mold part 13 are slightly retreated in the closed state to adjust the distance between the contact faces $F_1$ and $F_2$ to $X_2$ and relax the filament 3 (see FIG. 5).

Preferred relaxation ratios determined as a result of experiments made by us are as shown in Table 1.

Table 1

| Sample No. | Original Length (mm) of Filament | Length (mm) of Filament after Stretching | Moving Distance (mm) of Mold, $X_1$ | Relaxation Distance (mm), $X_1-X_2$ | Relaxation Ratio (%) | Shape of Attachment Device |
|---|---|---|---|---|---|---|
| 1 | 11 | 25 | 14 | 3 | 21.4 | good |
| 2 | 15 | 35 | 20 | 5 | 25 | good |
| 3 | 22 | 50 | 28 | 8-10 | 28.8-35.8 | good |
| 4 | 22 | 60 | 38 | 10 | 26.4 | good |

Fourth Step

When relaxation is completed at the preceding step, pins 16 and 17 are projected into the cavity, while the attachment device is being taken out of the upper mold parts 12 and 13, these two mold parts are moved in the direction Y. During this movement, the attachment device 1 is held in the cavity of the lower mold parts 10 and 11 (see FIG. 6).

Fifth Step

Then, pins 14 and 15 are projected to push out the attachment device 1 from the cavity. The attachment device 1 which has been completely separated from the mold is transferred to a predetermined position by transfer means such as air jets.

Attachment devices are prepared through the foregoing steps. The characteristic feature of the method of the present invention resides in the third step. When the stretching speed is not so high, since it is deemed that the heat treatment of the stretched filament 3 is advanced to some extent by the heat possessed by the mold, generation of stress by elastic recovery is relatively reduced. However, if stretching is completed within ½ second or a shorter time, it is observed that considerable internal stress is left in the filament 3 to cause large deformation in the attachment device.

Figure 7:
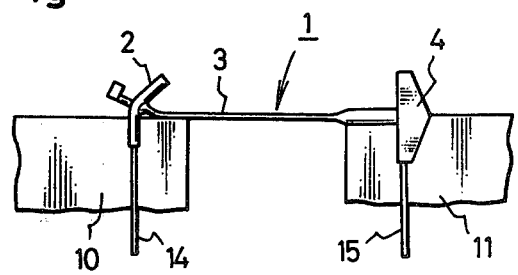
FIGS. 7 and 8 are diagrams illustrating the state where a defect or disorder is caused in the filament of an attachment device.

FIG. 7 illustrates the state of the attachment device observed when lower mold parts are released after stretching of the filament without relaxation. Since the filament 3 is not sufficiently heat-treated, a considerable tension is imposed on the filament 3, and the moment the upper mold parts separate from the lower mold parts, the cross-bar 2 is bent. If the cross-bar 2 is thus bent, it becomes impossible to set the attachment device together with a tag or the like to an apparatus for attaching the attachment device and tag to an article.

Accordingly, the attachment device having such bent cross-bar must be discarded as a defective product.

Figure 8:
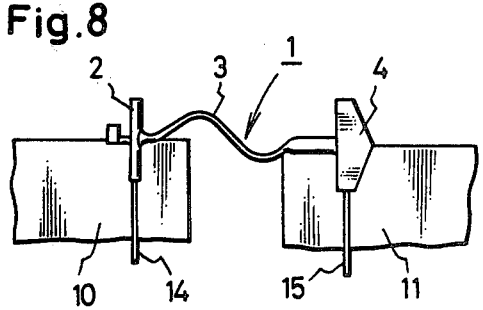

FIG. 8 illustrates the state of the attachment device observed when the stretched filament is relaxed excessinvely. If the filament is further relaxed after complete removal of the tension, the filament 3 is deformed along a curved line. The operations of molding and stretching an attachment device are completed in a very short time, and the attachment device per se is maintained at a sufficiently high temperature while the mold is making stretching, relaxing and opening movements. Therefore, if the filament is curved as pointed out above, it is thermally set while retaining substantially this curved configuration and the resulting attachment device becomes a defective product.

The present invention has been completed as a result of our research works made with a view to developing a method for preparing attachment devices while preventing occurrence of disadvantages illustrated in FIGS. 7 and 8. According to the present invention, just after the stretching step, the mold is not opened to take out the stretched attachment device from the mold, but after stretching of the attachment device, a relaxing action is given to the mold to remove the tension imposed on the filament and the mold is opened. This is the most characteristic feature of the present invention. By virtue of this characteristic feature, in the present invention it is possible to stretch the filament at a high speed and to produce large quantities of attachment devices having acurate shape and configuration.

As the speed of stretching the filament of an attachment device is enhanced, a viscoelastic stress (elastic energy) is generated in the filament. According to the present invention, this viscoelastic stress is mechanically released just before withdrawal of the stretched attachment device from the mold. In the present invention, even if the filament is instantaneously stretched, bending of the cross-bar is completely prevented. Accordingly, in the present invention, it is possible to stretch the filament of an attachment device at such a high speed as not attainable in the conventional methods.

In the present invention, the embodiment in which the filament of an attachment device is stretched by utilizing a mold used for molding of the attachment device is especially preferred, but an embodiment in which the molded attachment device is fed to a different stretching device and the filament is pre-heated and stretched at a high speed can be effectively worked in the present invention.

The relaxation ratio defined in the present invention is one determined based on experiments. More specifically, in the present invention, from experimental data as shown in Table 1 given hereinbefore, it is specified that the relaxing ratio is in the range of from 10 to 40%, preferably from 20 to 35%. If the relaxation ratio is maintained within this range, in case of an attachment device composed of nylon, the filament can be uniformly stretched without causing any substantial deformation in the attachment device.

Figure 9:
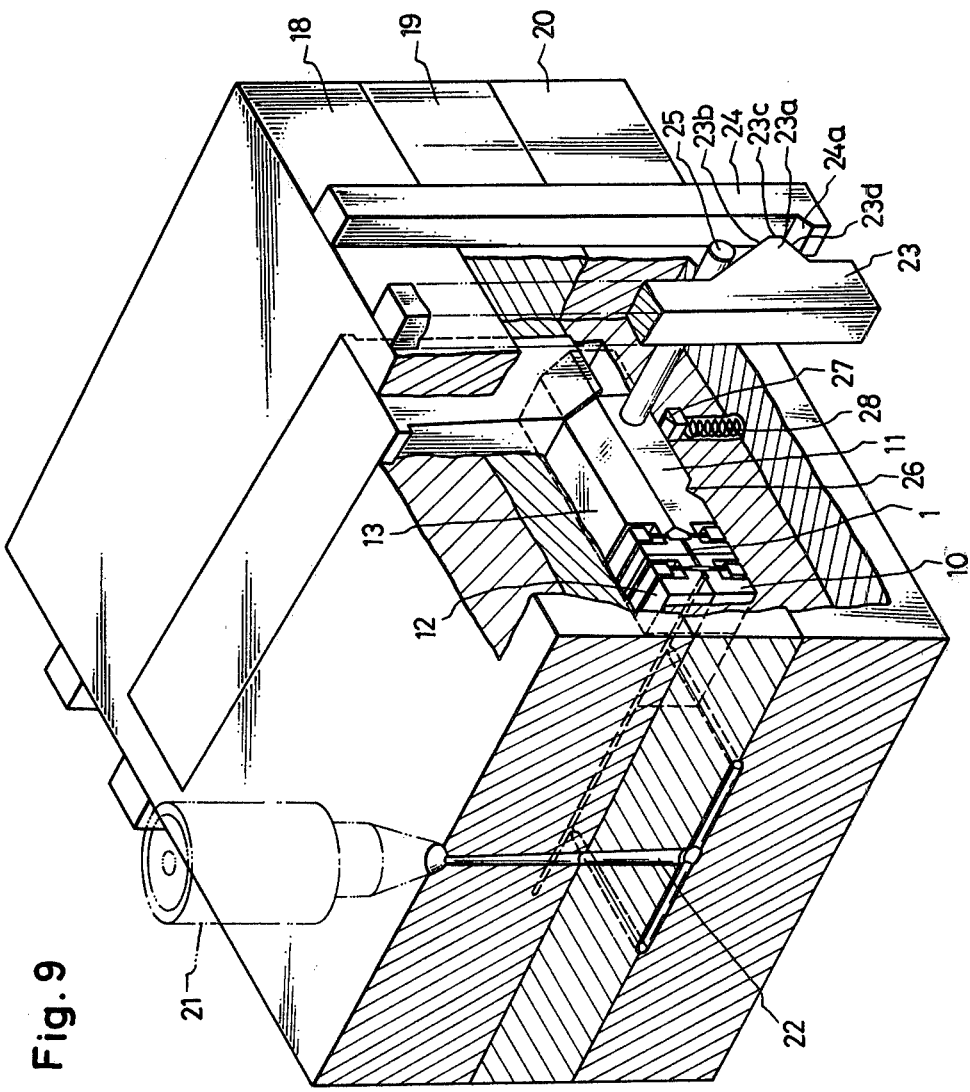
FIGS. 9 and 10 are a partially cut-out perspective view and a diagrammatic side view, each illustrating one embodiment of a molding and stretching apparatus for performing the moding and stretching operations according to the present invention.
Figure 10:
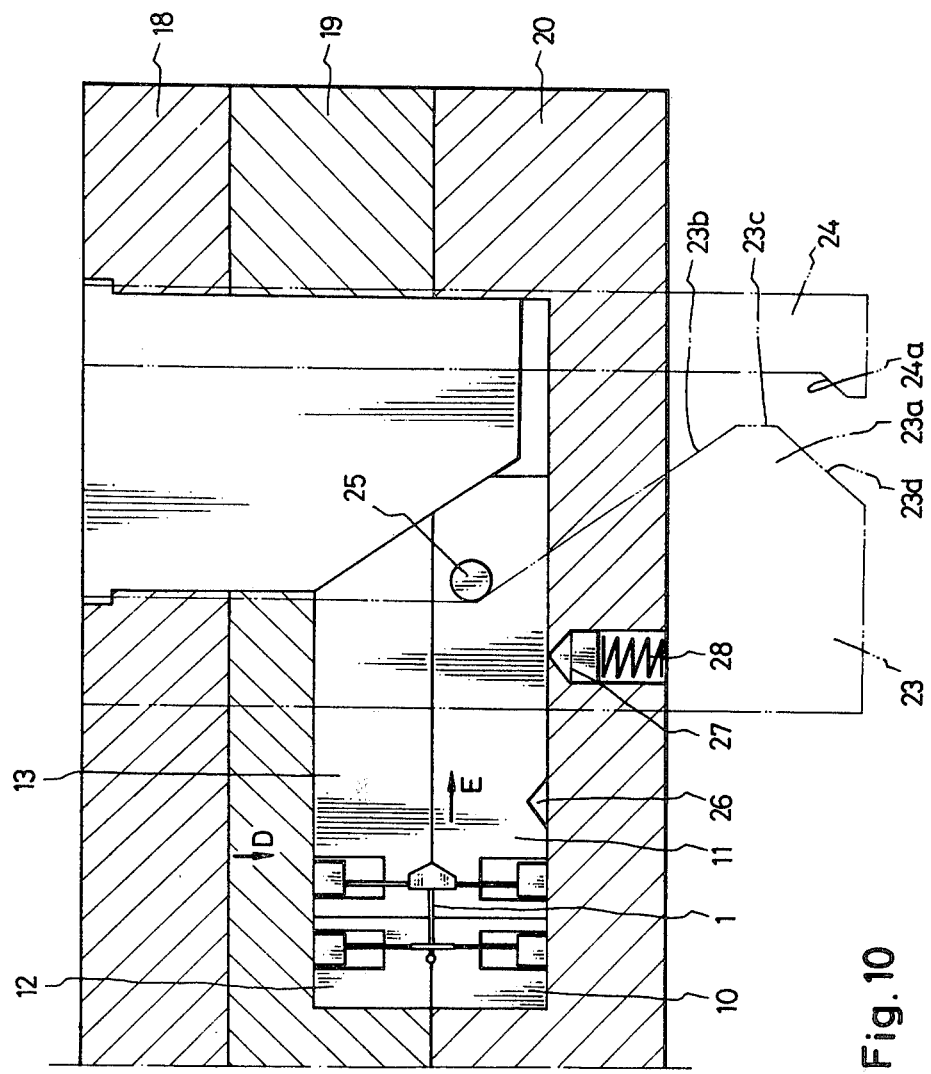

An embodiment of the molding and stretching apparatus for use in practising the method of the present invention is illustrated in FIGS. 9 and 10. Referring to FIGS. 9 and 10, mold parts 10, 11, 12 and 13 are located in the interior defined by a fixed frame 18 and movable frames 19 and 20 between the movable frames 19 and 20. The movable frames 19 and 20 can be moved so that they separate from the fixed frame 18, and the movable frames 19 and 20 can be moved relatively to each other. A synthetic resin is supplied from a nozzle 21 to the mold through a passage 22 for a molten resin.

A stretching cam rod 23 and a relaxing cam rod 24 are fixed to the side portion of the fixed frame 18. A projection 23a for stretching is formed on the stretching cam rod 23. The projection 23a has an inclined cam face 23b, a flat face 23c and an inclined face 23d inclined in a direction opposite to the inclination direction of the inclined cam face 23b. The relaxing cam rod 24 has in the lower portion thereof an inclined cam face 24a corresponding to the inclined face 23d.

A cam shaft 25 is projected from the side portion of the lower mold part 11, and this cam shaft 25 slides along the cam face 23b, flat face 23c and cam face 24a of the cam rods 23 and 24 to perform stretching and relaxation of the attachment device 1. A stopper groove 26 having a triangular sectional shape is formed on the bottom face of the lower mold part 11, and the stopper groove 26 is arranged so that a stopper 27 to be pressed by a spring 28 can be engaged with the stopper groove 26.

The operation of the apparatus having a structure as shown in FIGS. 9 and 10 will now be described.

An attachment device 1 is molded in a cavity defined by the mold parts 10, 11, 12 and 13, and then, the movable frames 19 and 20 are brought down in a direction separating from the fixed frame 18 as indicated by an arrow D in FIG. 10. With the downward movement of the movable frames 19 and 20, the mold parts 10, 11, 12 and 13 are simultaneously brought down, but since the cam shaft 25 fixed to the mold part 11 slides along the inclined cam face 23b of the stretching cam rod 23, the mold parts 11 and 13 are moved in a direction indicated by an arrow E in FIG. 10. At this point, the mold parts 10 and 12 are not moved in the direction E, and therefore, the filament 3 of the attachment device 1 is stretched. When the cam shaft 25 arrives at the flat face 23c, stretching of the filament is at its maximum, and as the mold is further brought down, the cam shaft 25 falls in contact with the inclined cam face 24a of the relaxing cam rod 24 and is forcibly moved along the inclined cam face 24a in a direction opposite to the direction E, namely in a return direction. Accordingly, the stretched filament 3 is forcibly relaxed in a quantity corresponding to the return movement of the cam shaft 25. The stopper groove 26 which has been moved through the stopper 25 in the direction E by the stretching force during the stretching operation is engaged with the stopper 27 at the relaxing step so that a desirable relaxation can be attained.

Relaxation of the filament 3 may be accomplished even without utilizing a forcible relaxing action as described above. More specifically, just after the stretching operation, the filament has, in general, an internal tension of about 2 kg acting in the relaxing direction, and for example, if 35 attachment devices 1 as one group are molded and stretched at one time, a tension of about 70 kg is imposed on the group of 35 attachment devices 1 as a whole. Accordingly, if the stretching force is removed from the filament 3 after the stretching operation, the filament 3 is relaxed by the self-relaxing action caused by the internal tension. In this case, if a stopper mechanism comprising, for example, the above-mentioned stopper 27 and stopper groove 26 in combination is provided, the relaxation ratio can easily be maintained within a desirable range.

After the above-mentioned relaxing treatment, a tough attachment device 1 having no internal stress can be obtained, and it is suitably used for attaching a price tag or the like to an article.

What is claimed is:

1. An apparatus for manufacturing attachment devices comprising:
   (a) a fixed frame;
   (b) a first movable frame which is movable in a direction separating it from said fixed frame;
   (c) a second movable frame which is movable in a direction separating it from said fixed frame, said first and second movable frames being movable relative to each other;
   (d) a first mold member disposed in said movable frame members;
   (e) a second mold member disposed in said movable frame members below said first mold member;
   (f) a third mold member disposed in said movable frame members, laterally positioned adjacent to said first mold member;
   (g) a fourth mold member disposed in said movable frame members laterally positioned adjacent to said second mold member, said fourth mold member being positioned below said third mold member, all of said mold members being positioned together to provide a mold cavity of a configuration conforming to that of the desired attachment devices;
   (h) a first cam rod secured to said fixed frame, said first cam rod having a surface, at least a portion of said surface being inclined in a direction laterally ourtward from said mold members;
   (i) a second cam rod secured to said fixed frame, said second cam rod having a surface, at least a portion of said surface being inclined in a direction laterally inward toward said mold members;
   (j) a cam shaft mounted on said fourth mold member, said cam shaft being slidably movable along said surfaces of said first and second cam rods;
   wherein, when said movable frames are moved relative to said fixed frame, the frames cause sliding movement of said cam shaft along said surface of said first cam rod, and then along said surface of said second cam rod, whereby said third mold member and said fourth mold member are caused to move away from said first mold member and said second mold member, thereby stretching said attachment devices while said cam shaft moves along said first cam rod surface, and whereby said third mold member and said fourth mold member are caused to move toward said first mold member and said second mold member to thereby forceably relax said attachment devices.

2. An apparatus for manufacturing attachment devices comprising:
   (a) a fixed frame;
   (b) a first movable frame which is movable in a direction separating it from said fixed frame;
   (c) a second movable frame which is movable in a direction separating it from said fixed frame, said first and second movable frames being movable relative to each other;
   (d) a first mold member disposed in said movable frame members;
   (e) a second mold member disposed in said movable frame members below said first mold member;
   (f) a third mold member disposed in said movable frame members, laterally positioned adjacent to said first mold member;
   (g) a fourth mold member disposed in said movable frame members laterally positioned adjacent to said second mold member, said fourth mold member being positioned below said third mold member, all of said mold members being positioned together to provide a mold cavity of a configuration conforming to that of the desired attachment devices;
   (h) a cam rod secured to said fixed frame, said cam rod having a surface, at least a portion of said surface being inclined in a direction laterally outward from said mold members;
   (i) a cam shaft mounted on said fourth mold member, said cam shaft being slidably movable along said surface of said cam rod;
   wherein said movable frames are moved relative to said fixed frame, thereby causing a sliding movement of said cam shaft along said surface of said cam rod, whereby said third mold member and said fourth mold members are caused to move away from said first mold member and said second mold member, thereby stretching said attachment devices while said cam shaft moves along said inclined cam rod surface, and whereby subsequent to said cam shaft reaching an apex of said inclined surface, the stretching force is removed and a self-relaxing action due to internal tension of the attachment devices draws said third and fourth mold members back toward said first and second mold members.

3. An apparatus as claimed in any of claims 1 or 2 wherein said fourth mold member is provided with a stop groove formed on its bottom surface, and said second movable frame further comprises a stopper member engageable with said stopper groove, said stopper groove being disposed at a position effective to control the degree of relaxing of the attachment devices.

4. An apparatus as claimed in any of claims 1 or 2 wherein said stopper member is biased toward said stop groove by an elastic means.

* * * * *